(12) United States Patent
Gretz

(10) Patent No.: US 7,109,419 B1
(45) Date of Patent: Sep. 19, 2006

(54) TEMPORARY AND DISPOSABLE ELECTRICAL BOX COVER

(75) Inventor: Thomas J. Gretz, Clarks Summit, PA (US)

(73) Assignee: Arlington Industries, Inc., Scraton, PA (US)

( * ) Notice: Subject to any disclaimer, the term of this patent is extended or adjusted under 35 U.S.C. 154(b) by 0 days.

(21) Appl. No.: 11/409,752

(22) Filed: Apr. 24, 2006

(51) Int. Cl.
H02G 3/14 (2006.01)

(52) U.S. Cl. .......................... 174/66; 174/67; 220/241

(58) Field of Classification Search ................ 174/66, 174/67; 220/241, 242; D8/353; 439/136; D13/177
See application file for complete search history.

(56) References Cited

U.S. PATENT DOCUMENTS

| | | | |
|---|---|---|---|
| 5,041,698 A | * | 8/1991 | Takagi et al. ............ 174/66 |
| 5,526,952 A | | 6/1996 | Green |
| 5,562,222 A | | 10/1996 | Jordan et al. |
| 5,998,735 A | * | 12/1999 | Patterson, Jr. ............ 174/67 |
| 6,076,696 A | | 6/2000 | Neuman |
| 6,172,301 B1 | * | 1/2001 | Goodsell .................. 174/66 |
| 6,681,948 B1 | | 1/2004 | Santa Cruz et al. |
| 6,949,708 B1 | | 9/2005 | Hausen et al. |

* cited by examiner

Primary Examiner—Dhiru R. Patel

(57) ABSTRACT

A temporary and disposable cover for an electrical box. The cover includes a faceplate, side walls, and flexible tabs projecting inwardly from the side walls. When placed upon an electrical box with a permanent cover, the indents seat behind the sidewalls of the permanent cover and hold the temporary cover thereon. While seated upon the electrical box, the temporary cover protects the permanent cover and the forward portion of the electrical box from spatter, overruns, or any other misdirected applications of stucco mud to the surface surrounding the electrical box. After the stucco has cured, the temporary cover is disposed of. The temporary cover is capable of being manufacture at a low cost per unit, thereby permitting it to be disposed of after the stucco has been cured.

16 Claims, 9 Drawing Sheets

TEMPORARY AND DISPOSABLE ELECTRICAL BOX COVER

FIELD OF THE INVENTION

This invention relates to temporary covers for electrical boxes and specifically to temporary and disposable cover that protects an electrical box from spatter and overrun encountered when stucco mud is applied to the area surrounding the electrical box.

BACKGROUND OF THE INVENTION

Buildings are commonly covered with stucco, especially in hot areas such as the Southeastern and Southwestern areas of the United States. Typically the building framework is first erected. Electrical services are then typically installed to the framework so that each receptacle, light fixture, and other electrical device can be mounted securely to an exposed stud or beam. Electrical wiring is then completed to each device and a substrate installed to cover the framework. Stucco is then typically spread over the substrate to provide a pleasing finished surface for the building.

Unfortunately, stucco frequently sticks to items other than the intended substrate, such as the electrical boxes that have been mounted in the substrate. Thus, during the application of stucco to the substrate, the installer must slow down and take care not to get stucco on the exposed portion of the electrical box. Many outdoor electrical boxes include a permanent cover to protect the electrical device installed within from weather such as snow or rain. Stucco installers then, as a result of spreading mud around the electrical box, frequently create spatter or overruns that contaminate the exposed portions of the electrical box or the permanent cover. Once the stucco cures, the spatter or overrun is not easily removed and this leads to an unsightly electrical box installation.

Some stucco installers apply masking tape around the outer portion of the electrical box to limit the portions of the box exposed to the stucco mud. This is not entirely satisfactory as it slows down the job and it is difficult to properly cover the entire permanent cover and exposed portions of the electrical box. Additional time is lost when the installer must later return and remove all of the tape from the electrical box and from the permanent cover.

What is needed therefore is a device to temporarily cover an electrical box and its permanent cover. The device should be capable of being manufactured at a low cost per unit, as it will be temporary and disposed of after the stucco wall has cured. The device should also be easy to install and easy to remove from the electrical box.

SUMMARY OF THE INVENTION

The invention is a temporary and disposable cover for an electrical box. The cover includes a faceplate, a sidewall, and flexible tabs projecting inwardly from the sidewall. When placed upon an electrical box with a permanent cover, the flexible tabs seat behind the sidewalls of the permanent cover and hold the temporary cover to the electrical box. While seated upon the electrical box, the temporary cover protects the permanent cover and the forward portion of the electrical box from spatter, overruns, or any other misdirected applications of stucco mud to the surface surrounding the electrical box. After the stucco has cured, the temporary cover is simply disposed of. The temporary cover can be produced at low cost, thereby allowing it to be disposed of after the stucco has been cured.

OBJECTS AND ADVANTAGES

One advantage of the temporary and disposable electrical box cover is that it protects the permanent cover and the forward portion of the electrical box from spatter, overruns, or other stucco contamination during the stucco application step.

Another advantage provided by the temporary and disposable electrical box cover is that it can be produced at low cost, allowing it to be disposable after it is used.

A further advantage provided by the temporary and disposable electrical box cover is that it enables the stucco installers to complete the stucco application in less time, as they will not need to slow down during application of stucco mud around the electrical box.

Figure 1:
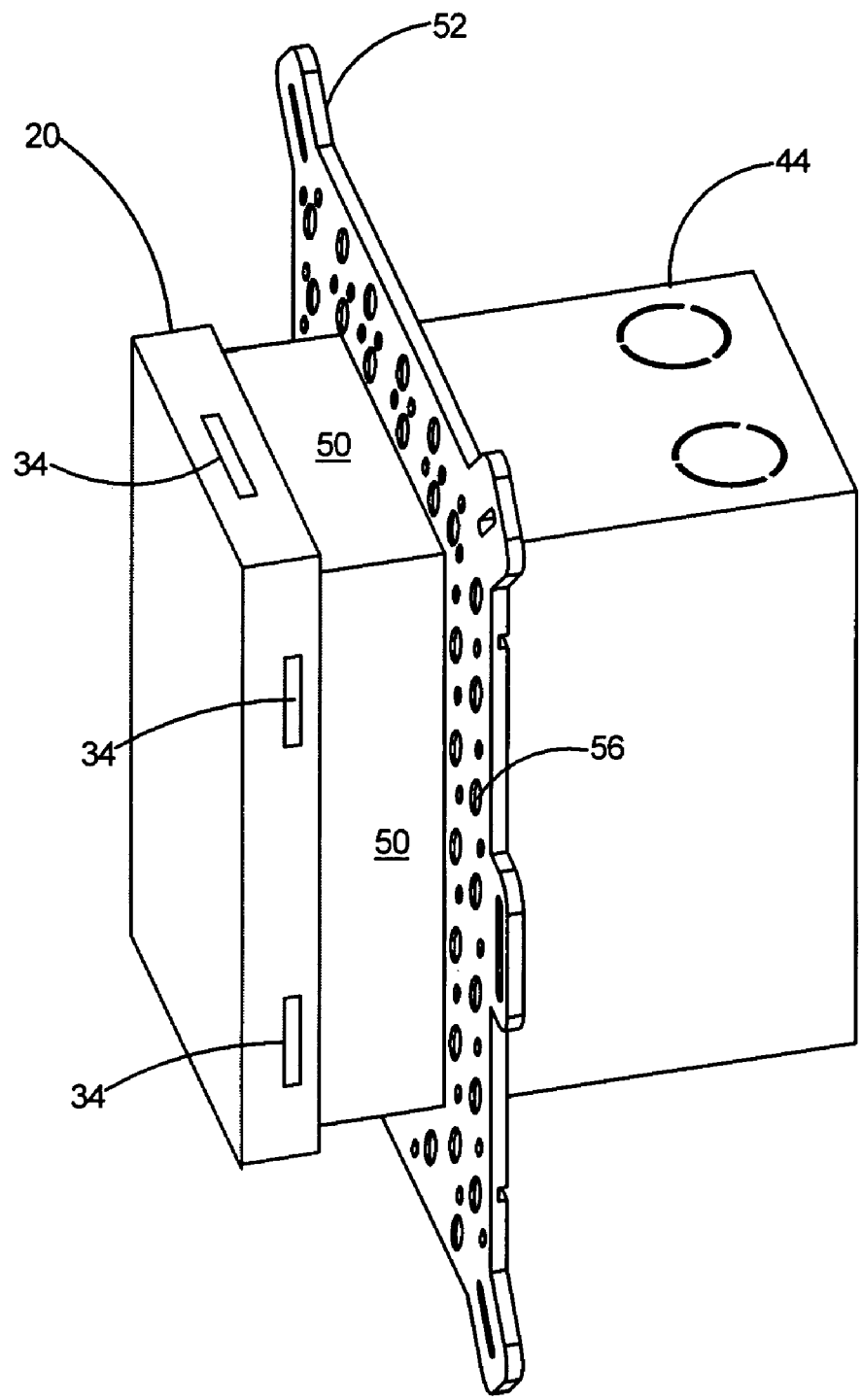
FIG. 1 is a perspective view of a temporary and disposable electrical box cover according to the present invention installed on an electrical box.

Table of Nomenclature
21) The following is a listing of part numbers used in the drawings along with a brief description:

| Part Number | Description |
|---|---|
| 20 | temporary and disposable electrical box cover |
| 22 | faceplate |
| 24 | rear surface of faceplate |
| 26 | faceplate sidewall |
| 28 | inner surface of faceplate sidewall |
| 30 | outer surface of faceplate sidewall |
| 32 | edge of faceplate sidewall |

-continued

Table of Nomenclature
21) The following is a listing of part numbers used in the drawings along with a brief description:

| Part Number | Description |
| --- | --- |
| 34 | flexible tab |
| 36 | latch of electrical box |
| 38 | extension |
| 40 | front surface of faceplate |
| 42 | forward surface of flexible tab |
| 44 | electrical box with permanent cover |
| 45 | wall |
| 46 | permanent cover |
| 47 | back edge of permanent cover |
| 48 | sidewall of permanent cover |
| 50 | sidewall of electrical box |
| 52 | flange |
| 54 | directional arrow |
| 56 | holes in flange |
| 58 | substrate |
| 60 | stucco layer |
| 70 | electrical box |
| 72 | sidewall of electrical box |
| 74 | front edge of electrical box |
| 76 | outer surface of electrical box |
| 78 | recess in outer surface of electrical box |
| 80 | directional arrow |
| 82 | juncture of sidewall and faceplate |
| $\theta$ | angle of sidewall of temporary cover with respect to the faceplate |
| $d_1$ | first distance from forward surface of tab to rear surface of faceplate |
| $d_2$ | distance flexible tabs extend from inner surface of faceplate sidewall |
| $d_3$ | clearance between flexible tabs laterally across temporary cover |
| $d_4$ | clearance between flexible tabs longitudinally across temporary cover |
| $d_5$ | distance sidewall of temporary cover extends from faceplate |
| $d_6$ | distance of recess from front edge of electrical box |

DETAILED DESCRIPTION OF THE INVENTION

The present invention comprises a temporary and disposable cover for use in protecting an electrical box mounted on a building that will be finished with stucco. The cover prevents spatter and overrun from contaminating the permanent cover and the outer portion of the electrical box that will extend outwards from the stucco wall surface.

Figure 3:
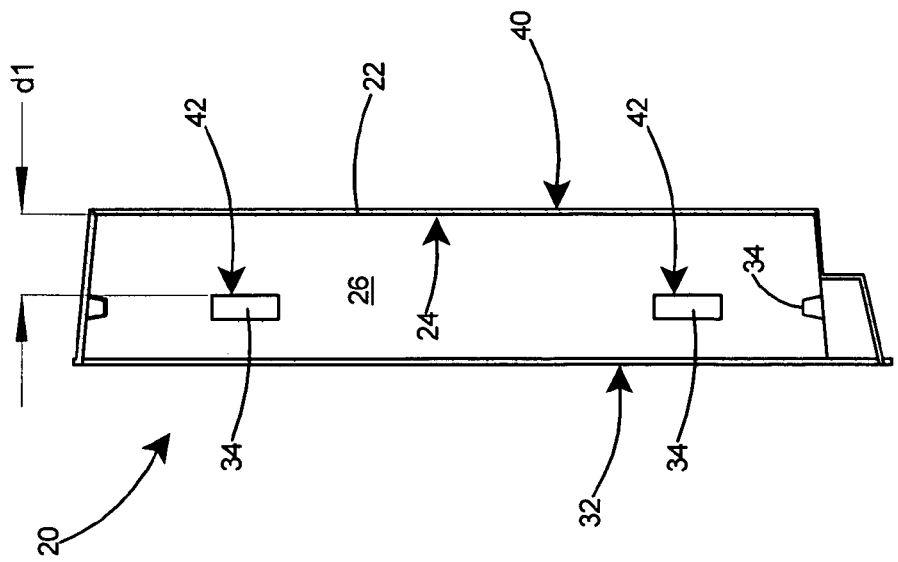
FIG. 3 is a sectional view of the temporary and disposable electrical box cover taken along line 3—3 of FIG. 2.
Figure 2:
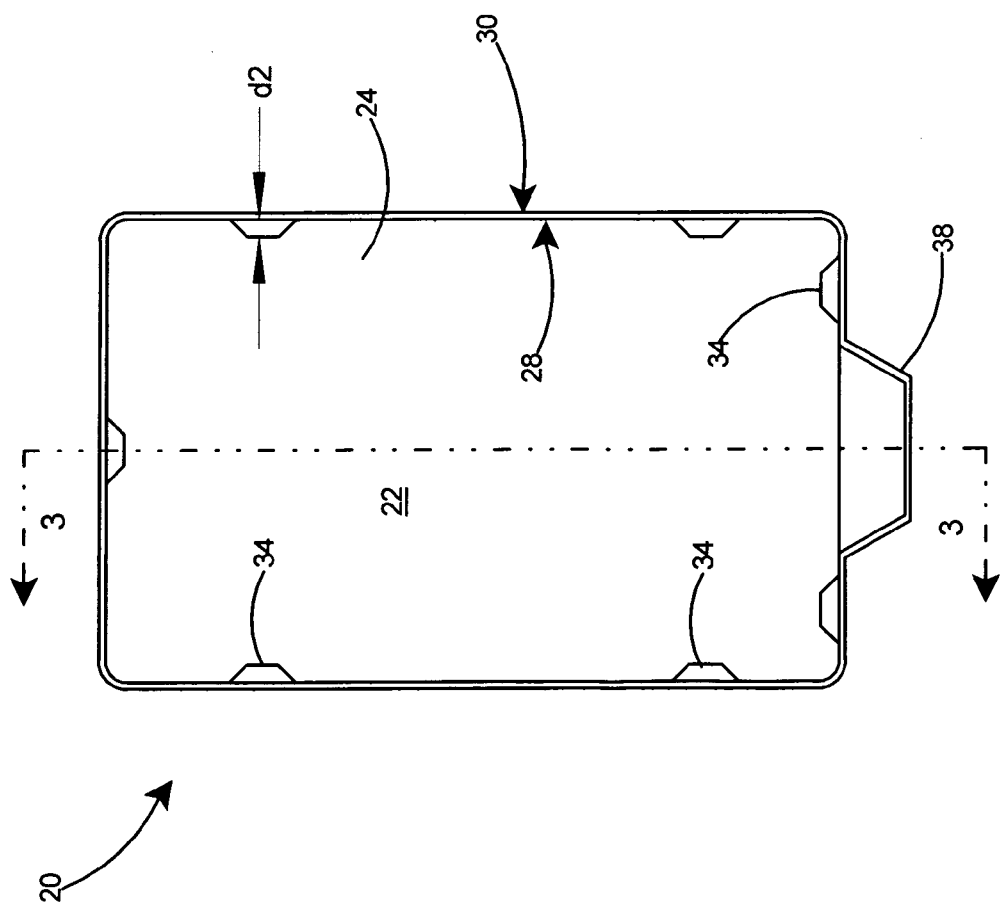
FIG. 2 is a rear view of a temporary and disposable electrical box cover according to the present invention.
Figure 5:
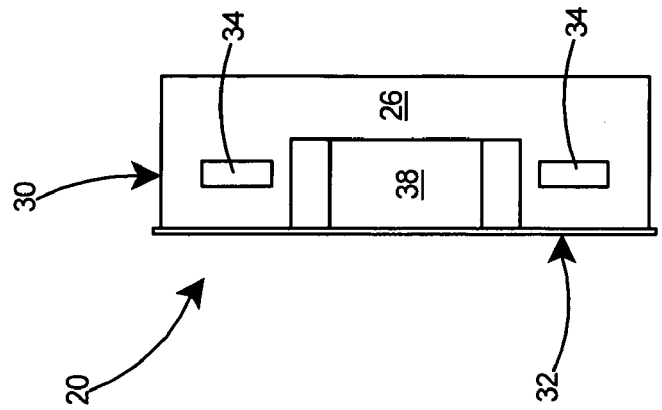
FIG. 5 is an end view of the temporary and disposable electrical box cover as viewed from line 5—5 of FIG. 4.

With reference to a preferred embodiment depicted in FIGS. 2 and 3, the temporary and disposable electrical box cover 20 includes a faceplate 22 with a rear surface 24. A sidewall 26 is integral with and extends rearward from the faceplate 22. The faceplate sidewall 26 includes an inner surface 28, an outer surface 30, and an edge 32. A plurality of flexible and resilient tabs 34 extend inwardly from the inner surface 28 of the faceplate sidewall 26. The cover 20 further includes an extension 38 from the outer surface 30 of the faceplate sidewall 26 to enable the cover 20 to clear outward extending portions of an electrical box, such as the latch 36 shown in FIG. 6, that it will be used in conjunction with.

Referring to the sectional view of the temporary and disposable cover 20 in FIG. 3, the faceplate 22 further includes a front surface 40. Each of the flexible tabs 34 includes a forward surface 42 facing the rear surface 24 of the faceplate 22. The forward surface 42 of each flexible tab 34 is located a first distance $d_1$ from the rear surface 24 of the faceplate 22. Preferably, the flexible tabs 34 extend between 0.05 and 0.07 inch from the inner surface 28 of the sidewall 26 of the faceplate 22, indicated by distance $d_2$ in FIG. 2.

Figure 4:
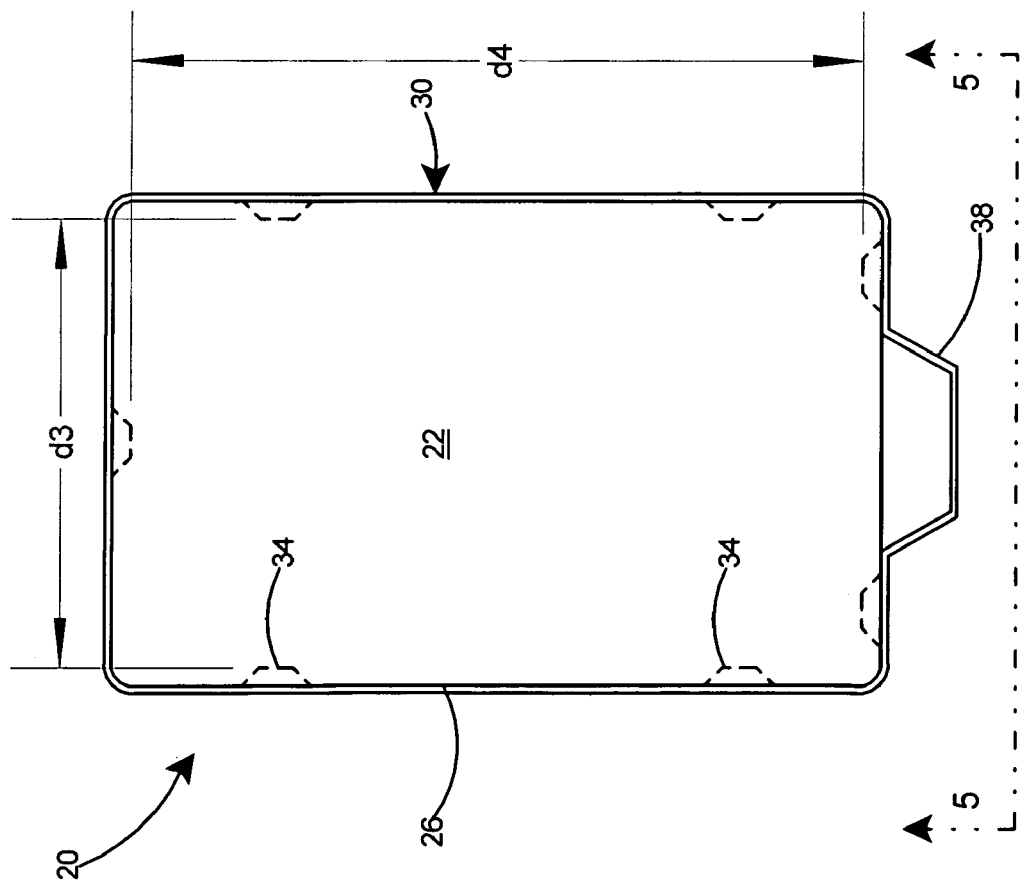
FIG. 4 is a front view of the temporary and disposable electrical box cover of FIG. 2.
Figure 8:
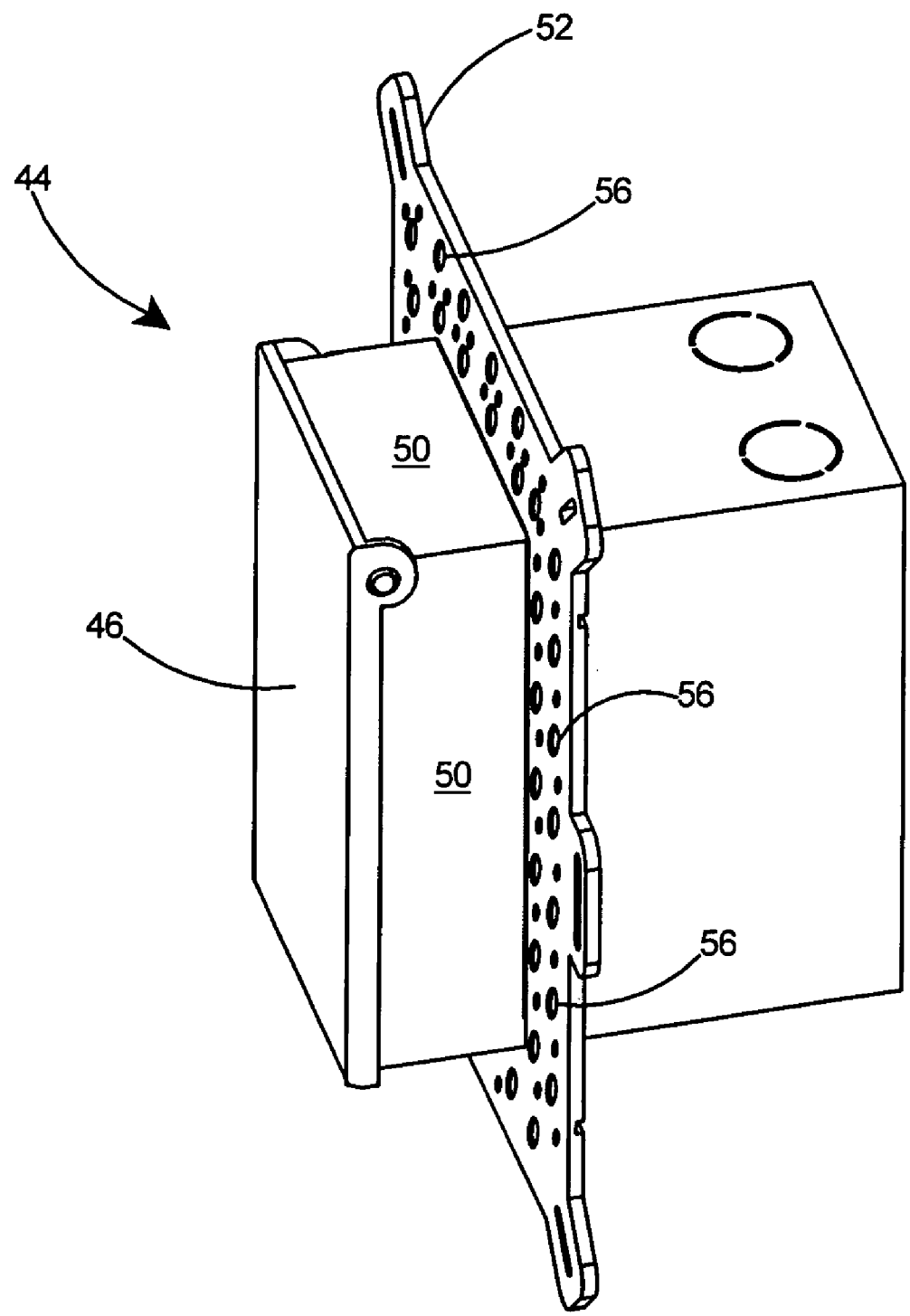
FIG. 8 is a perspective view of a recessed electrical box with a permanent cover of the type that can be protected by the temporary and disposable cover of the present invention.

Reference to the front view of the cover 20 in FIG. 4 shows that the faceplate 22 is substantially rectangular-shaped for use with a conventional rectangular-shaped electrical box such as that shown in FIG. 8. The temporary and disposable cover of the present invention is not however limited to a rectangular shape as other shapes can be formed to cover electrical boxes of other shapes, such as circular-shaped boxes.

Figure 6:
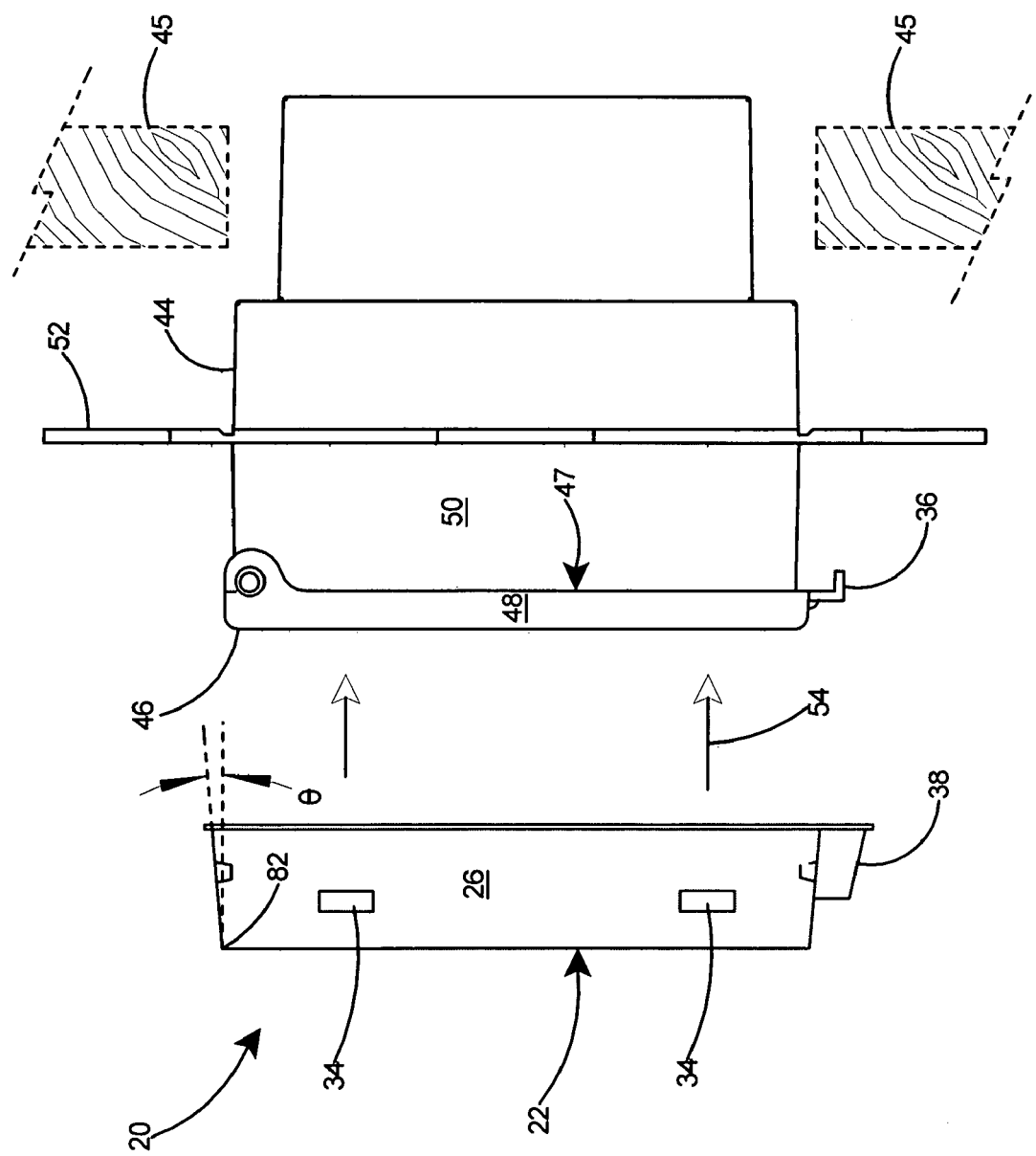
FIG. 6 is a side view of the temporary and disposable electrical box cover exploded away from an electrical box having a permanent cover and with the temporary cover in alignment to be installed on the electrical box.

Referring to FIG. 6, the temporary and disposable cover 20 of the present invention is used for protecting an electrical box 44 after it is secured to a wall 45 and during the installation of stucco wall covering (not shown) around the box. An electrical box 44 for exterior use typically includes a permanent cover 46 having sidewalls 48 as shown in FIG. 6. The sidewalls 48 of the permanent cover 46 include a back edge 47. The electrical box 44 also includes sidewalls 50 and may include a flange 52 for use in securing the electrical box 44 to the wall 45. An electrical box as shown in FIG. 6 is disclosed in U.S. Pat. No. 6,956,171, the entire contents of which is incorporated herein by reference.

Preferably, the temporary and disposable cover 20 of the present invention is formed from a sheet of plastic resin material in a vacuum thermoforming process. Any conventional plastic resin for thermoforming may be used to construct the cover including polyvinyl chloride, polyethylene terephthalate, polystyrene, or polypropylene. Preferably, the disposable cover is thermoformed to a thickness of between 6 and 12 mils, thereby enabling the cover to be flexible and resilient.

To operate the present invention, the temporary and disposable cover 20 is simply pressed forwards, in the direction of the arrows 54 in FIG. 6, upon the permanent cover 46 and the electrical box 44. Being thermoformed of plastic, the faceplate 22, sidewall 26, and flexible tabs 34 are of generally the same thickness and the flexible tabs 34 are resilient and capable of being deformed. The clearance between the flexible tabs 34 on the cover 20, depicted by distances $d_3$ and $d_4$ in FIG. 4, is less than the distance across the permanent cover 46 on the electrical box 44 in the respective lateral and longitudinal directions. As the cover 20 is pressed upon the electrical box 44, the flexible tabs 34 are biased outwardly by the sidewalls 48 of the permanent cover 46.

Figure 7:
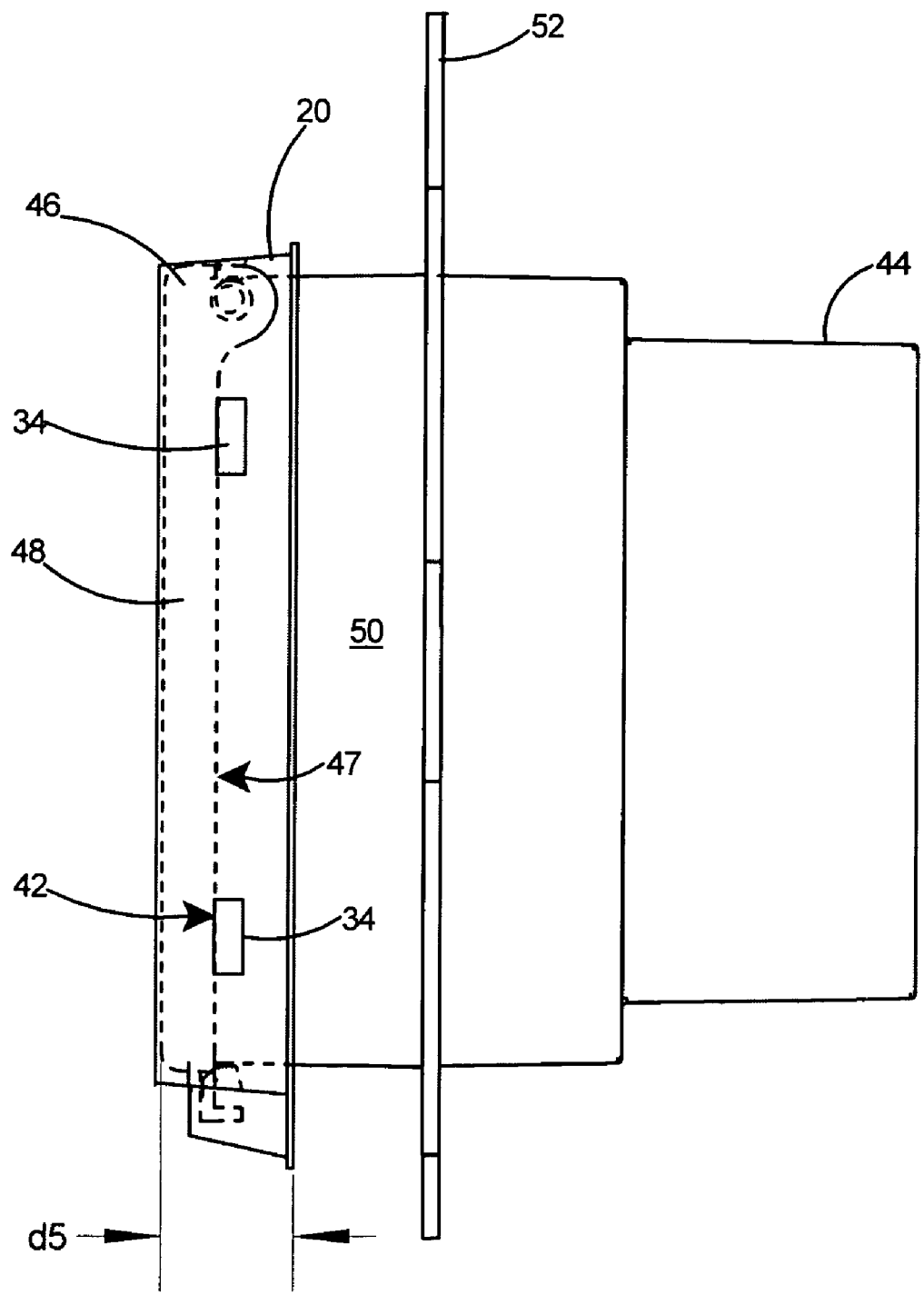
FIG. 7 is a side view of the temporary and disposable electrical box cover and the electrical box of FIG. 6 after the temporary cover has been installed on the electrical box.

Referring to FIG. 7, after the flexible tabs 34 clear the back edge 47 of the permanent cover 46, the flexible tabs 34 snap inwardly to their unbiased positions and thereby hold the temporary cover 20 on the electrical box 44. Pushing the temporary cover 20 fully upon the electrical box 44 therefore enables the forward surfaces 42 of the flexible tabs 34 to snap inwardly and engage the sidewalls 48 of the permanent cover 46 thereby holding the temporary cover 20 on the electrical box 44. The preferred thickness of the cover enables the cover to be manufactured at a low cost and also contributes greatly to the flexibility and resiliency of the flexible tabs 34.

Preferably, the sidewall 26 of the temporary cover 20 extends between 0.60 and 0.80 inch from the rear surface 24 of the faceplate 22, indicated by distance $d_5$ in FIG. 7. Thus the sidewall 26 of the temporary cover 20 acts as a skirt to prevent stucco mud (not shown) from contaminating the permanent cover 46 and the forward portion of the sidewalls 50 of the electrical box 44. The temporary cover 20 therefore protects the portion of the electrical box sidewalls 50 that is beyond the eventual intended layer of stucco.

FIG. 8 depicts in perspective view an electrical junction box 44 of the type having a permanent cover 46. Although the electrical box 44 shown includes a flange 52, the temporary cover 20 would also work equally well to cover a non-flanged electrical box of the type having a permanent cover as described herein. The flanged electrical box 44 as depicted in FIG. 8 includes a flange 52 having a plurality of holes 56 which will facilitate the adhesion of stucco (not shown) to the flange 52. This type of electrical box, which is designed specifically for stucco applications, includes boxes designated Dry Box Vertical Masonry/Stucco Single Gang with Clear Cover (DBVM1C) and Dry Box Vertical Masonry/Stucco Single Gang with White Cover (DBVM1W), and are available from Arlington Industries of Scranton, Pa.

Figure 9:
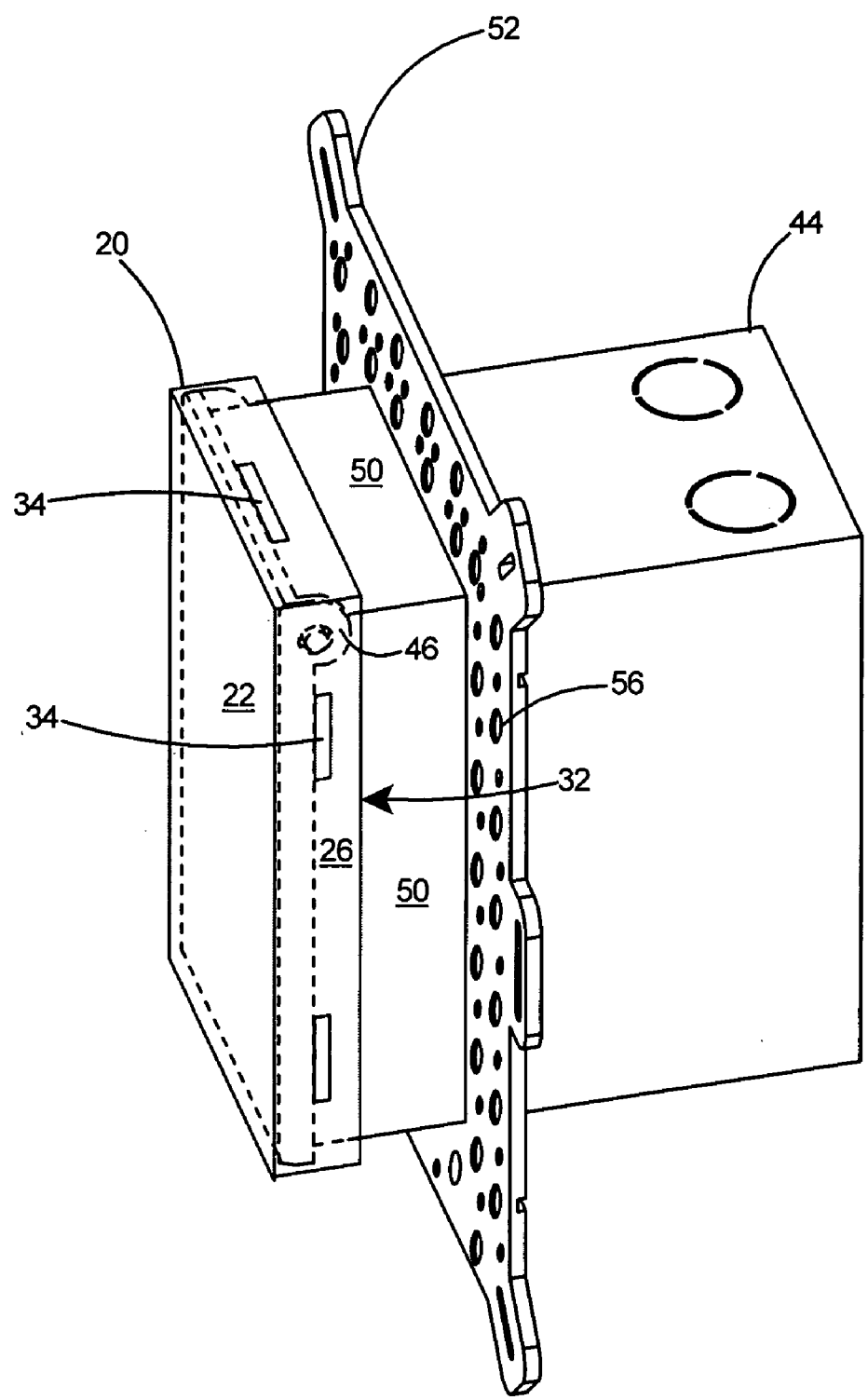
FIG. 9 is a perspective view of a recessed electrical box and a permanent cover with a temporary and disposable cover installed thereon.

After the temporary and disposable cover 20 of the present invention is secured to the electrical box 44, as shown in FIG. 9, the cover 20 protects the permanent cover 46 and the forward portion of the electrical box sidewalls 50 that is expected to be beyond the eventual applied layer of stucco. The cover 20 may be produced of either clear or opaque plastic. FIG. 9 depicts an electrical box 44 covered and protected by a clear temporary cover 20. As shown in FIG. 1, the temporary cover 20 can also be constructed of opaque plastic.

Referring to FIG. 9, the sidewall 26 of the temporary cover 20 extends around the entire periphery of the faceplate 22, thereby enabling the cover 20 to grasp and hold securely onto the electrical box 44 after it is pushed thereon. As a result of the sidewall extending around 100% of the periphery of the faceplate 22 and 100% of the periphery of the permanent cover 46 and the electrical box 44, the temporary cover 20 cannot be easily shifted or knocked off the box without intent to do so. However, the disposable cover 20 can be easily removed when required, as it is releasable by grasping the temporary cover 20 behind the edge 32 of the sidewall 26 and pulling outwards from the electrical box 44.

To further assist the holding action of the temporary cover 20 to the electrical box 44, as shown in FIG. 6, the sidewall 26 of the temporary cover 20 is not normal with respect to the faceplate 22 but is flared outwards at an angle θ preferably of between 2 and 5 degrees from normal or perpendicular with the faceplate 22. Additionally, the inner dimensions across the temporary cover 20 at the juncture 82 of the sidewall 26 and the faceplate 22 are generally equal to the outer dimension across the permanent cover 26. Therefore, when the cover 20 is pushed fully upon the permanent cover 26, there is a tight fit of the temporary cover 20 upon the permanent cover 26.

Figure 10:
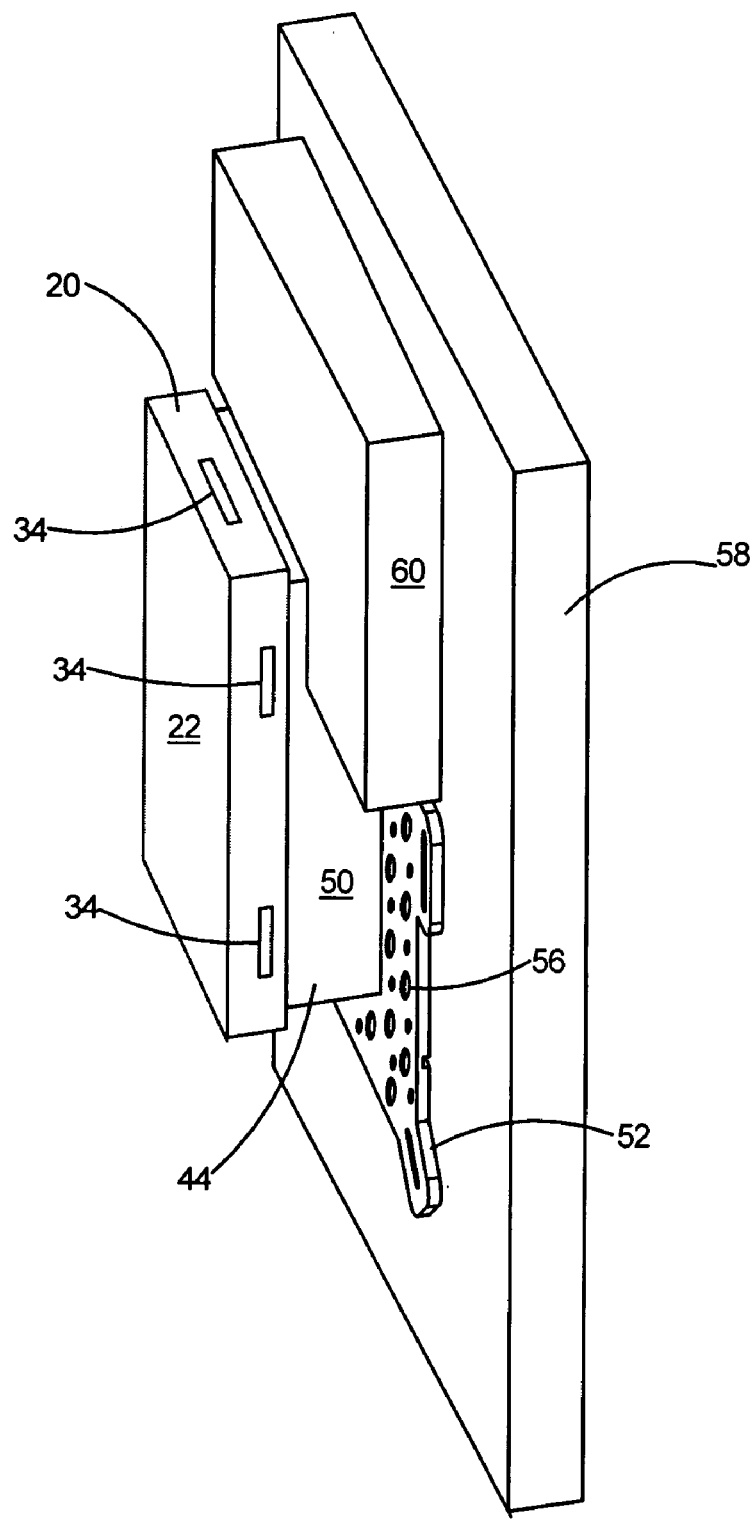
FIG. 10 is a perspective of the temporary cover and electrical box of FIG. 9 but after the electrical box has been mounted on a wall with the stucco wall covering partially installed around a portion of the electrical box.

With reference to FIG. 10, the electrical box 44 is shown mounted to the substrate layer 58 of a building and depicts a portion of the stucco layer 60 that has been applied to the substrate 58. The temporary and disposable cover 20 can remain in place on the electrical box 44 until the stucco has cured.

Figure 11:
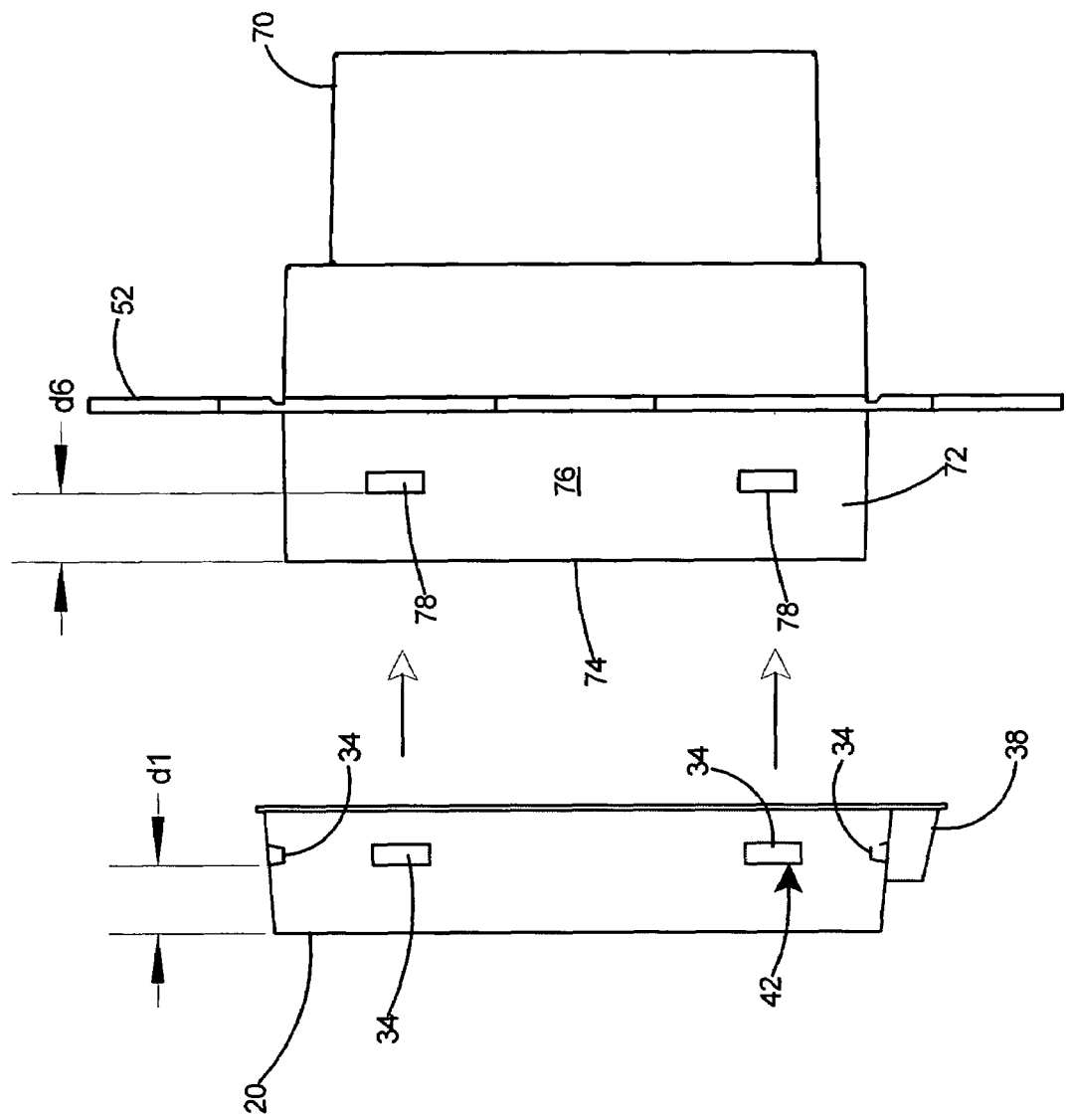
FIG. 11 is a side view of the temporary and disposable electrical box cover exploded away from an electrical box having recesses in the sidewall of the electrical box and with the temporary cover in alignment to be installed thereon.

The temporary and disposable electrical box cover 20 can also be used to for an electrical box 70 that does not include a permanent cover, as shown in FIG. 11. Electrical box 70 includes sidewalls 72, a front edge 74, an outer surface 76 on the sidewalls 72, and one or more recesses 78 in the outer surface 76 of the sidewalls 72. The recesses 78 are located a distance $d_6$ from the front edge 74 of the electrical box 70. This distance $d_6$ is generally equal to the first distance $d_1$ from the forward surface 42 of the flexible tab 34 to rear surface 24 of the faceplate 22 (as shown in FIGS. 3 and 11 and described herein). Therefore, when the temporary cover 20 is pushed in the direction of the arrows 80 in FIG. 11 upon the electrical box 70, the flexible tabs 34 will snap inwardly and the forward surfaces 42 of the tabs 34 will engage the corresponding recess 78 of the electrical box 70 thereby securing the temporary cover 20 to the electrical box 70.

After the stucco is installed completely around the periphery of the electrical box as described herein, the temporary cover 20 is simply disposed of. The permanent cover of the electrical box is then available to protect the interior electrical device against weather elements such as snow and rain.

Having thus described the invention with reference to a preferred embodiment, it is to be understood that the invention is not so limited by the description herein but is defined as follows by the appended claims.

What is claimed is:

1. A temporary and disposable electrical box cover for use with an electrical box having sidewalls, a front edge, an outer surface on the sidewalls, and a recess in the outer surface of the sidewalls comprising:
    a faceplate having a rear surface;
    a sidewall integral with and extending from said faceplate, said sidewall having an inner surface and an edge;
    a plurality of flexible tabs extending inwardly from said inner surface of said sidewall, said flexible tabs including a forward surface facing said faceplate;
    said forward surface of said flexible tabs located a first distance from said rear surface of said faceplate; and
    said first distance generally equal to the distance of the recess from the front edge of the electrical box,
    whereby pushing said temporary cover fully upon the electrical box enables said forward surfaces of said flexible tabs to snap inwardly and engage the recess of the electrical box thereby holding said temporary cover on the electrical box.

2. The electrical box cover of claim 1 wherein said flexible tabs extend between 0.05 and 0.07 inch from said inner surface of said sidewall.

3. The electrical box cover of claim 1 wherein said faceplate is substantially rectangular-shaped.

4. The electrical box cover of claim 1 wherein said sidewall of said temporary cover extends between 0.60 and 0.80 inch from said rear surface of said faceplate.

5. The electrical box cover of claim 1 wherein said temporary cover is formed in a vacuum thermoforming process.

6. The electrical box cover of claim 5 wherein said temporary cover is thermoformed of plastic.

7. The electrical box cover of claim 6 wherein said plastic is selected from the group including polyvinyl chloride, polyethylene terephthalate, polystyrene, or polypropylene.

8. A temporary and disposable electrical box cover for use with an electrical box having a permanent cover with sidewalls thereon comprising:
    a faceplate having a rear surface;
    a sidewall integral with and extending from said faceplate, said sidewall having an inner surface and an edge;
    a plurality of flexible tabs extending inwardly from said inner surface of said sidewall, said flexible tabs including a forward surface facing said faceplate;
    said forward surface of said flexible tabs located a first distance from said rear surface of said faceplate; and
    said first distance generally equal to the width of the sidewalls of the permanent cover, whereby pushing said temporary cover fully upon the electrical box enables said forward surfaces of said flexible tabs to snap inwardly and engage the sidewalls of the permanent cover thereby holding said temporary cover on the electrical box.

9. The electrical box cover of claim 8 wherein said flexible tabs extend between 0.05 and 0.07 inch from said inner surface of said sidewall.

10. The electrical box cover of claim 8 wherein said faceplate is substantially rectangular shaped.

11. The electrical box cover of claim 8 wherein said sidewall of said temporary cover extends between 0.60 and 0.80 inch from said rear surface of said faceplate.

12. The electrical box cover of claim 8 wherein said temporary cover is formed in a vacuum thermoforming process.

13. The electrical box cover of claim 12 wherein said temporary cover is thermoformed of plastic resin; and said plastic resin is selected from the group including polyvinyl chloride, polyethylene terephthalate, polystyrene, or polypropylene.

14. The electrical box cover of claim 8 wherein said sidewall of said temporary cover extends between 0.60 and 0.80 inch from said rear surface of said faceplate.

15. The electrical box cover of claim 8 wherein said temporary and disposable cover is molded in a thermoforming process to a thickness of between 6 and 12 mils.

16. The electrical box cover of claim 8 wherein said sidewall of said temporary and disposable cover is flared outwards at an angle of between 2 and 5 degrees from normal or perpendicular with said faceplate.

* * * * *